United States Patent
Erdman et al.

(10) Patent No.: US 9,519,113 B2
(45) Date of Patent: Dec. 13, 2016

(54) DEBRIS-REMOVING CAP FOR OPTICAL DEVICES

(71) Applicant: Tyco Electronics Corporation, Berwyn, PA (US)

(72) Inventors: David D. Erdman, Hummelstown, PA (US); Tao Ling, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/635,754

(22) Filed: Mar. 2, 2015

(65) Prior Publication Data
US 2016/0259131 A1    Sep. 8, 2016

(51) Int. Cl.
G02B 6/36    (2006.01)
G02B 6/38    (2006.01)
G02B 6/25    (2006.01)

(52) U.S. Cl.
CPC .............. *G02B 6/3849* (2013.01); *G02B 6/25* (2013.01); *G02B 6/387* (2013.01); *G02B 6/3866* (2013.01)

(58) Field of Classification Search
CPC .............. G02B 6/25; G02B 6/32; G02B 6/38; G02B 6/3821; G02B 6/3849; G02B 6/3853; G02B 6/3866; G02B 6/387; G02B 6/3879; G02B 6/3887; G02B 6/4204; G02B 6/4206; G02B 6/4292; B08B 1/003; B08B 1/006; B08B 1/008; A61B 1/00089
USPC ........ 385/53, 57, 61, 93, 134–135, 137, 147
See application file for complete search history.

(56) References Cited

U.S. PATENT DOCUMENTS

| | | | |
|---|---|---|---|
| 8,460,180 B1 * | 6/2013 | Zarate | A61B 1/00089 600/127 |
| 2011/0249335 A1 | 10/2011 | Strawderman et al. | |
| 2012/0082417 A1 * | 4/2012 | Stanley | G02B 6/3866 385/77 |
| 2013/0183000 A1 | 7/2013 | Erdman et al. | |
| 2014/0099058 A1 | 4/2014 | Charbonneau-Lefort et al. | |
| 2014/0133803 A1 | 5/2014 | Rosenberg et al. | |

(Continued)

FOREIGN PATENT DOCUMENTS

| | | |
|---|---|---|
| JP | 2010 117443 A | 5/2010 |
| WO | WO 2014/118225 A1 | 8/2014 |
| WO | WO 2014/120143 A1 | 8/2014 |

OTHER PUBLICATIONS

US Conec Ltd.; Prizm LightTurn Connector, www.usconec.com; Hickory, NC.

(Continued)

*Primary Examiner* — Akm Enayet Ullah
*Assistant Examiner* — Michael Mooney

(57) ABSTRACT

Debris-removing cap includes a cap body having a receiving cavity and an interior surface disposed within the receiving cavity. The cap body is configured to be attached to an optical device such that a mating face of the optical device is disposed within the receiving cavity. The interior surface is configured to face the mating face of the optical device. The debris-removing cap also includes a lens wiper that is coupled to the interior surface within the receiving cavity and extends away from the interior surface toward the mating face of the optical device. The lens wiper moves relative to the mating face when activated by a user of the debris-removing cap. The lens wiper engages a lens of the mating face when activated by the user to remove debris from the lens.

20 Claims, 5 Drawing Sheets

(56) References Cited

U.S. PATENT DOCUMENTS

2014/0185990 A1     7/2014   Hodge et al.
2014/0270651 A1     9/2014   Kadar-Kallen et al.
2015/0323747 A1*   11/2015   Leigh ...................... G02B 6/38
                                                                  385/61

OTHER PUBLICATIONS

US Conec Ltd.; MXC Connectors; www.usconec.com; Hickory, NC.
US Conec Ltd.; Ferrule, 12F, Prizm LightTurn; www.usconec.com; Hickory, NC.
Extended European Search Report for EP Patent Application No. 16157219.3, mailed Jul. 12, 2016.

* cited by examiner

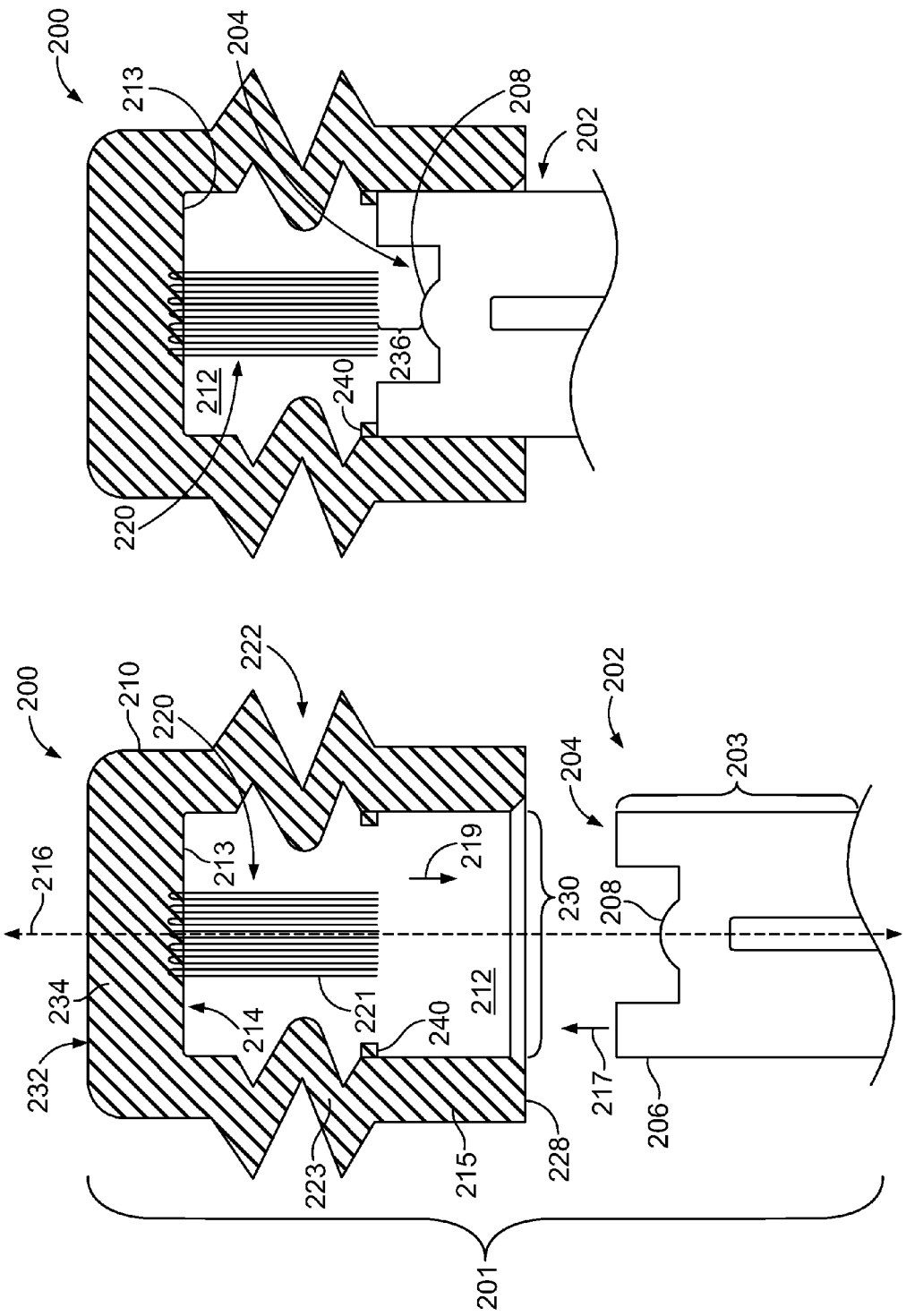

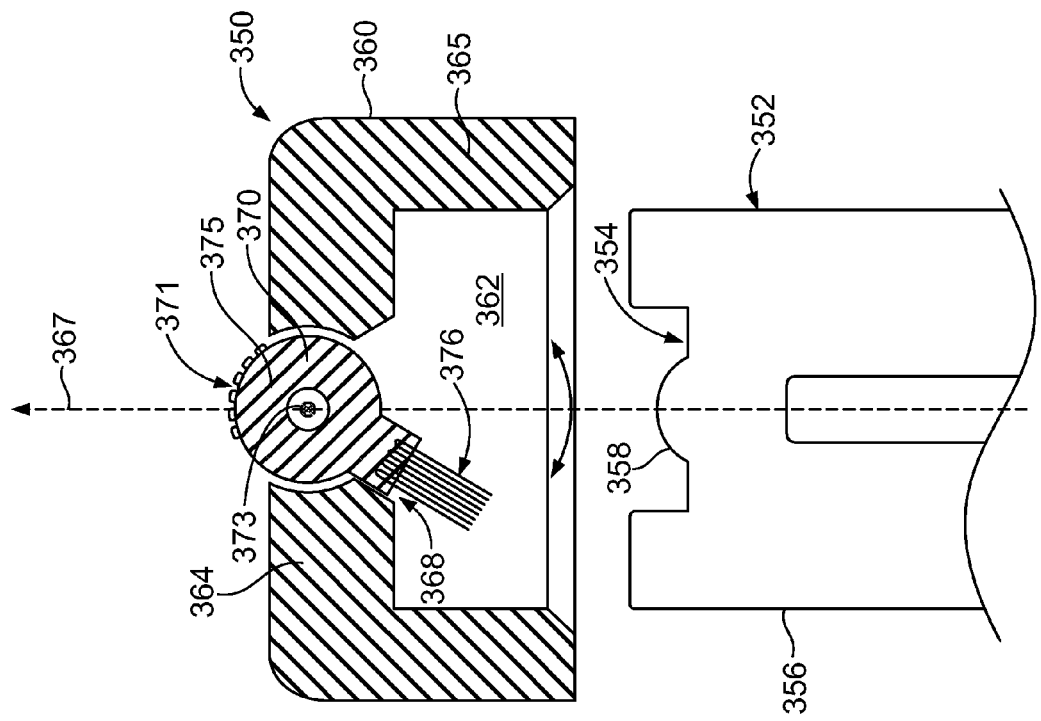
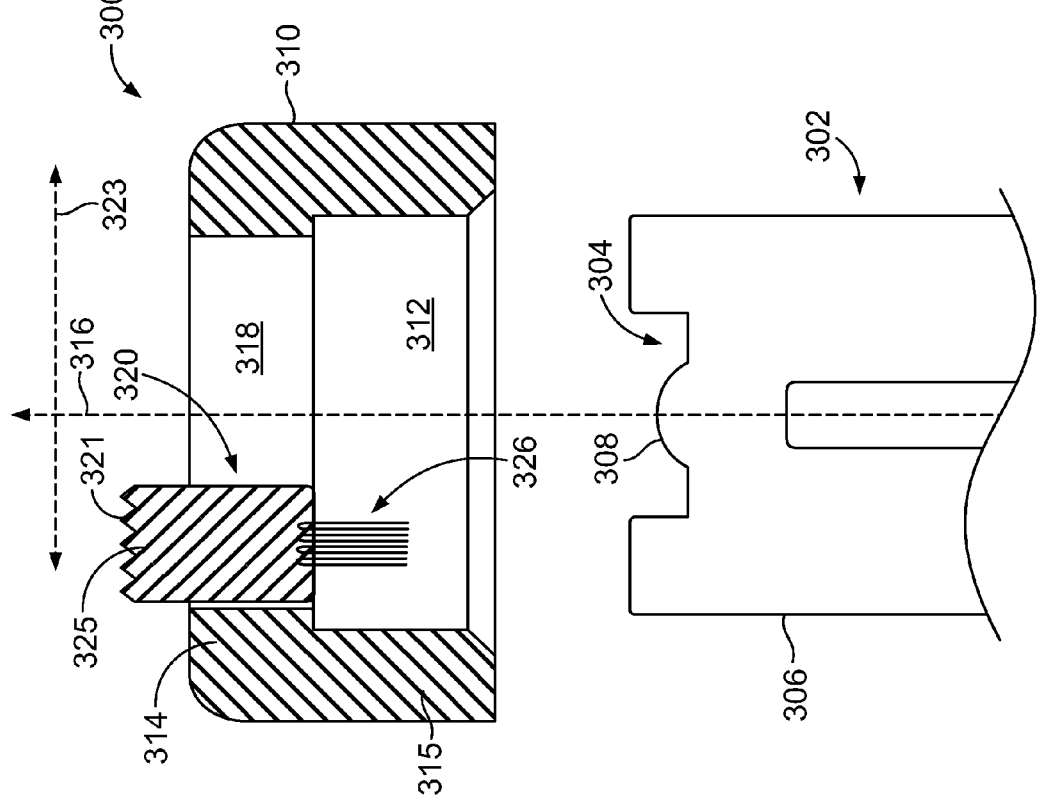

DEBRIS-REMOVING CAP FOR OPTICAL DEVICES

BACKGROUND

The subject matter herein relates generally to optical devices having exposed lenses.

Optical communication may have advantages over electrical communication in certain applications. Increasingly, both large communication systems and small devices, such as consumer devices, are using optical pathways to transmit data signals through the system or device. The optical pathways may include optical fibers, lenses, and/or other material that permits light to propagate therethrough. When two optical devices are mated, the optical components (e.g., lenses or fibers) are aligned with each other so that light emitting from one component is received by the other component.

At least some known optical devices include a ferrule body that optically connects a number of optical fibers to corresponding lenses of a lens array. For example, the ferrule body may include a plurality of channels that each receive and orient a corresponding optical fiber so that the optical fiber is aligned with a corresponding lens of the lens array. The ferrule body may then be positioned adjacent to another optical device. For instance, each lens of the ferrule body may be aligned with another lens and/or optical fiber of the other optical device. Optical devices may be mated with each other in various manners. For some types of optical devices, the lenses face in the direction of insertion. For example, the lenses may be positioned along a side face of a pluggable optical device. In other types of optical devices, however, the lenses may face in a direction that is perpendicular to the insertion direction or perpendicular to the optical fibers.

One challenge that is often confronted by optical devices is that dust or other debris may exist along the lenses and negatively affect optical transmission. The debris is typically removed using a separate cleaning mechanism. For example, prior to mating the optical devices, a technician may clean each lens array using a tool. Such a cleaning process may be time-consuming and/or labor-intensive and, consequently, expensive.

Accordingly a need exists for alternative mechanisms or methods of cleaning one or more optical surfaces of an optical connector.

BRIEF DESCRIPTION

In an embodiment, a debris-removing cap is provided that includes a cap body having a receiving cavity and an interior surface disposed within the receiving cavity. The cap body is configured to be attached to an optical device such that a mating face of the optical device is disposed within the receiving cavity. The interior surface is configured to face the mating face of the optical device. The debris-removing cap also includes a lens wiper that is coupled to the interior surface within the receiving cavity and extends away from the interior surface toward the mating face of the optical device. The lens wiper moves relative to the mating face when activated by a user of the debris-removing cap. The lens wiper engages a lens of the mating face when activated by the user to remove debris from the lens.

In an embodiment, a debris-removing cap is provided that includes a cap body having an interior surface that defines a receiving cavity. The cap body is configured to be attached to an optical device such that a mating face of the optical device is disposed within the receiving cavity. The debris-removing cap also includes a lens wiper coupled to the cap body and positioned within the receiving cavity. The lens wiper has an activation surface that is exposed to an exterior of the cap body and is configured to be engaged by a user of the debris-removing cap. The lens wiper engages a lens of the mating face and sweeps across the mating face when activated by the user to remove debris from the lens.

BRIEF DESCRIPTION OF THE DRAWINGS

FIG. 3 is a side cross-sectional view of a debris-removing cap formed in accordance with an embodiment prior to being coupled onto an end of an optical device.

FIG. 4 is a side cross-sectional view of the debris-removing cap of FIG. 3 prior to being activated by a user for cleaning the mating face of the optical device.

FIG. 6 is a side cross-sectional view of a debris-removing cap formed in accordance with an embodiment, FIG. 7 is a side cross-sectional view of a debris-removing cap formed in accordance with an embodiment.

DETAILED DESCRIPTION

Embodiments set forth herein include debris-removing caps that are configured to interact with an optical device (e.g., a pluggable optical connector) having a mating face that includes a lens. The debris-removing caps include cap bodies that may be configured to removably attach to the optical device. For example, if the optical device is a pluggable optical connector, the cap body may surround a pluggable end of the optical connector and form an interference fit therewith. The optical device may be received within a receiving cavity that is defined by the cap body. The debris-removing cap may include a lens wiper within the receiving cavity of the cap body. The lens wiper is configured to be activated by a user. More specifically, a force generated by the user may be used to move the lens wiper or translated into a force that moves the lens wiper. The lens wiper may sweep across the mating face and/or the lens of the optical device and thereby clean the lens. The lens wiper may be configured to remove dust, oil, and/or other contaminants.

Figure 1:
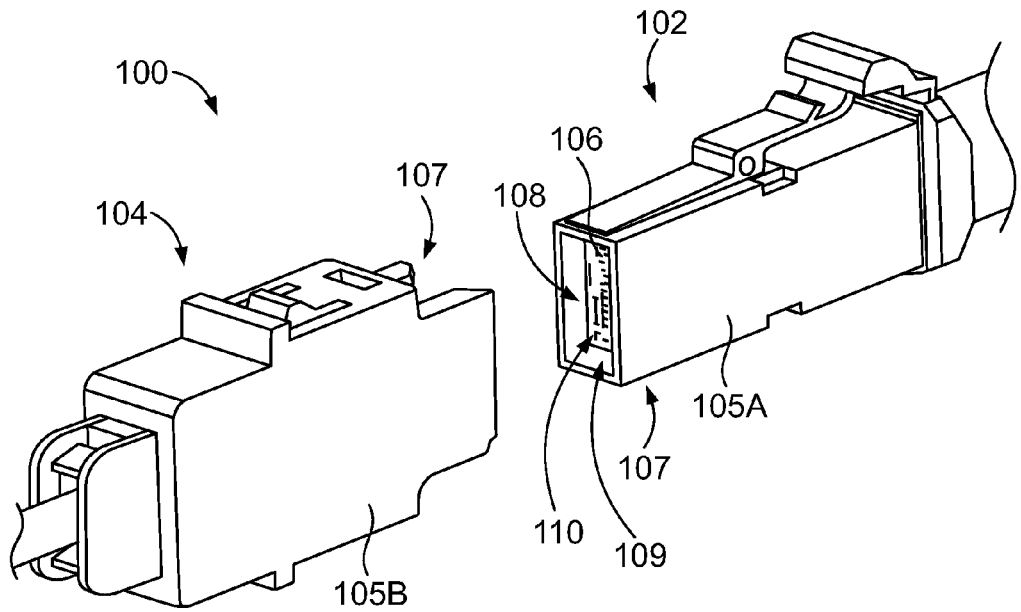
FIG. 1 is a perspective view of an optical communication system including a pair of optical cable assemblies.

FIG. 1 is a perspective view of an optical communication system 100 including first and second optical cable assemblies 102, 104. The first and second optical cable assemblies 102, 104 are configured to mate with each other to establish an optical connection therebetween. The first and second optical cable assemblies 102, 104 include first and second connector housings 105A, 105B that are configured to mate with each other. The connector housing 105A, 105B define respective mating ends 107. The mating ends 107 may include openings to housing cavities 109 that include respective ferrule bodies 106 disposed therein. Each of the ferrule bodies 106 has a mating face 108 that includes a lens array 110. The ferrule bodies 106 of the first and second optical cable assemblies 102, 104 are configured to face each other when the first and second optical cable assemblies 102, 104 are mated so that the corresponding lens arrays 110 are aligned for optical transmission. The first and second optical cable assemblies 102, 104 may form a pluggable engagement in some embodiments.

The first and second optical cable assemblies 102, 104 include respective optical cables 111 having optical fibers (not shown) extending therethrough. The optical cables 111 may include, for example, ribbon cables in which one or more rows of optical fibers include the optical fibers arranged side-by-side. The first and second optical cable assemblies 102, 104 may be configured to satisfy various industry or governmental standards. In some embodiments, the cable assemblies described herein may be high-speed cable assemblies that are capable of transmitting data at a rate of at least about four (4) gigabits per second (Gbps), at least about 10 Gbps, at least about 20 Gbps, at least about 40 Gbps, or more. Although the cable assemblies may be high-speed cable assemblies in some embodiments, the cable assemblies may transmit at slower transmission speeds or data rates in other embodiments.

Figure 2:
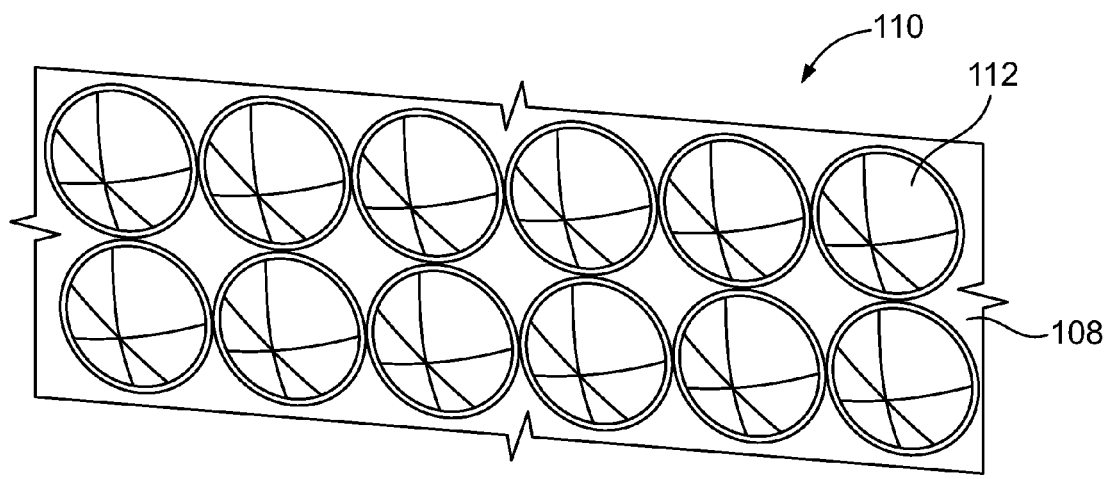
FIG. 2 is an enlarged perspective view of a lens array that may be used by the optical cable assemblies.

FIG. 2 illustrates a portion of an exemplary lens array 110. As shown, the lens array 110 includes a plurality of lenses 112 (hereinafter ferrule lenses 112). Each of the ferrule lenses 112 is a convex lens that protrudes from the mating face 108. In the illustrated embodiment, the lens array 110 includes twelve (12) ferrule lenses 112. However, in other embodiments, the lens array 110 may include any number of ferrule lenses 112. By way of example, the lens array 110 may include 2, 4, 8, 12, 16, 32, or 64 ferrule lenses 112. It should be understood that the lens array 110 may include other numbers of ferrule lenses 112, including an odd number of ferrule lenses 112. In an alternative embodiment, the mating face 108 may include only a single ferrule lens 112.

FIGS. 3-9 illustrate debris-removing caps that are configured to cover or cap a mating face of an optical device. The optical device may be, for example, an optical connector having a ferrule body, such as the ferrule body 106 (FIG. 1). The optical devices may be optical cable assemblies, such as the optical cable assemblies 102, 104. In FIGS. 3-9, the optical devices include only a single ferrule lens. It should be understood, however, that the optical devices may include a lens array having a plurality of lenses, such as the lens array 110 (FIG. 2). When activated by a user, the debris-removing caps may wipe the ferrule lenses using a lens wiper to remove debris (e.g., dust, oil, or other contaminants) therefrom. In the illustrated embodiments, only a single lens wiper is used to wipe the ferrule lens. It is contemplated, however, that embodiments may include more than one lens wiper. It is also contemplated that the debris-removing cap and the optical device will be assembled together as a kit or assembly.

FIG. 3 is a side cross-sectional view of a debris-removing cap 200 formed in accordance with an embodiment. The debris-removing cap 200 is configured to cover a mating face 204 of an optical device 202. In some embodiments, the optical device 202 is a pluggable optical connector. In an illustrated embodiment, the optical device 202 includes a ferrule body 206 that has the mating face 204. The optical device 202 includes a ferrule lens 208 that is to be cleaned or wiped by the debris-removing cap 200. The debris-removing cap 200 and the optical device 202 may form a kit or assembly 201.

In the illustrated embodiment, the debris-removing cap includes a cap body 210 having a receiving cavity 212 and an interior surface 214 that defines the receiving cavity 212.

A portion of the interior surface 214 forms a cover surface or portion 213. The cap body 210 includes an activation surface 232. The activation surface 232 is exposed to an exterior of the cap body 210. The back and activation surfaces 213, 232 face in opposite directions and may define a cover wall 234 therebetween. The cap body 210 may also include a sleeve wall 215 that is coupled to the cover wall 234.

As shown in FIG. 3, the cap body 210 is oriented with respect to a loading axis 216. The mating face 204 of the optical device 202 is configured to face in a first direction 217 along the loading axis 216. In the illustrated embodiment, the cover surface 213 (or the cover wall 234) is oriented generally perpendicular or orthogonal to the loading axis 216 and faces in a second direction 219 that is opposite the first direction 217. The sleeve wall 215 extends generally parallel to the loading axis 216. In the illustrated embodiment, the loading axis 216 is a central axis that extends through a center of the receiving cavity 212. The sleeve wall 215 surrounds the loading axis 216 and is configured to surround the optical device 202. The sleeve wall 215 may have a cross-section that is taken transverse to the loading axis 216 that is similar in shape to a cross-section of the optical device 202. For example, the sleeve wall 215 may have a circular cross-section and form a tube that surrounds the optical device 202. In other embodiments, the sleeve wall 215 may have a square or rectangular cross-section that surrounds the optical device 202. In some embodiments, the sleeve wall 215 may be shaped to form an interference fit with the optical device 202.

Also shown in FIG. 3, the debris-removing cap includes a lens wiper 220 that is coupled to the cover surface 213 within the receiving cavity 212 and extends away from the cover surface 213 toward the mating face 204 of the optical device 202. The lens wiper 220 may include one or more elements of a flexible or compressible material(s). For example, in the illustrated embodiment, the lens wiper 220 comprises a plurality of flexible bristles or strands 221. In other embodiments, the lens wiper 220 may comprise a compressible material, such as foam or a sponge.

The lens wiper 220 is configured to engage and wipe the mating face 204 to remove debris from the ferrule lens 208. More specifically, the sleeve wall 215 includes a flex section 222 that surrounds a portion of the receiving cavity 212. The flex section 222 may include folds or bellows 223 that permit compression of the flex section 222. In the illustrated embodiment, the flex section 222 surrounds the lens wiper 220. In other embodiments, however, the flex section 222 may be located proximate to a cap edge 228 of the sleeve wall 215. The cap edge 228 defines an opening 230 to the receiving cavity 212. In other embodiments, the flex section 222 may extend from the cover wall 234 to the cap edge 228 such that the flex section 222 forms the entire sleeve wall 215.

Figure 5:
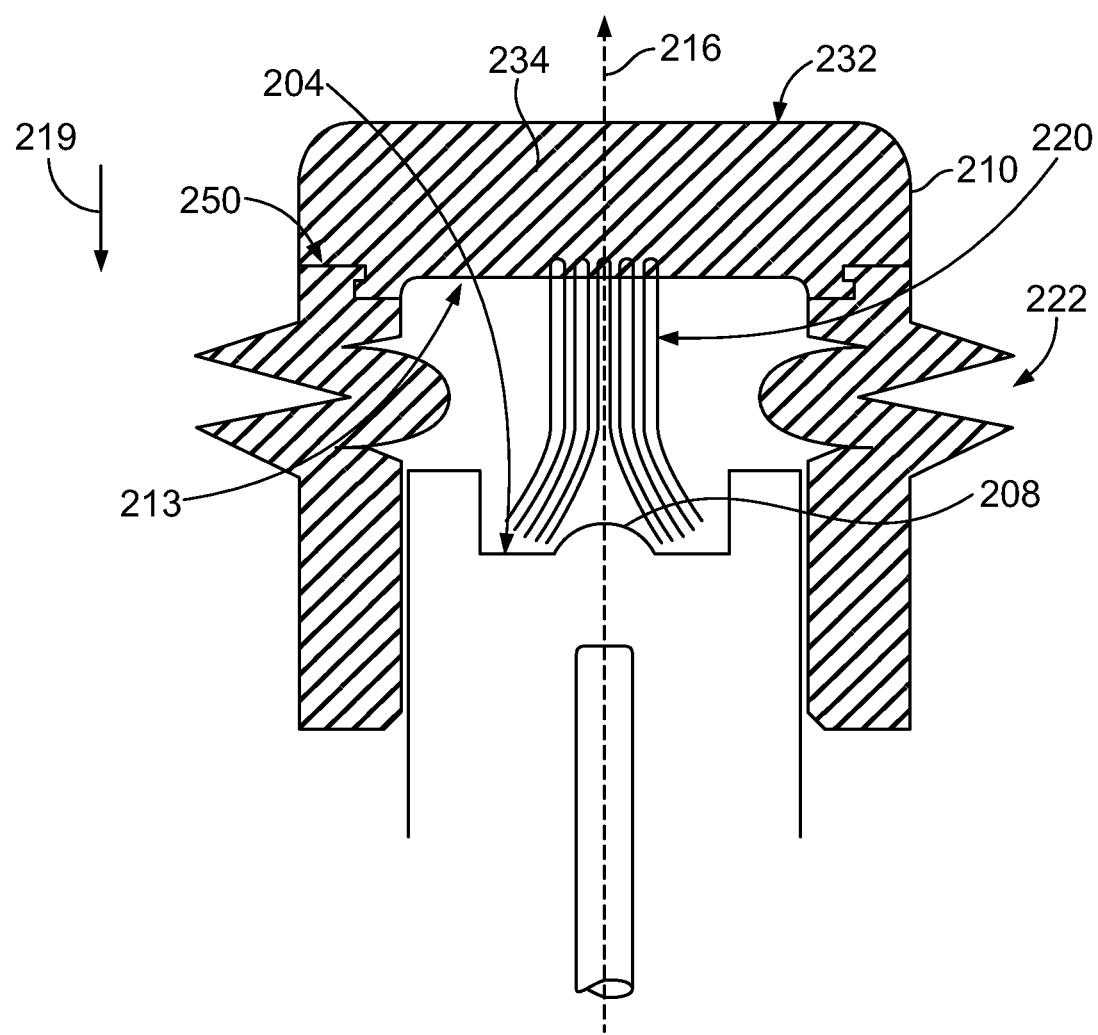
FIG. 5 is a side cross-sectional view of the debris-removing cap of FIG. 3 during activation by a user.

The optical device 202 includes a mating end 203. The mating end 203 may be a portion of the optical device 202 that is inserted into the receiving cavity 212. The debris-removing cap 200 may be shaped relative to the mating end 203 such that the mating end 203 or the optical device 202 is prevented from moving beyond a predetermined point or depth within the receiving cavity 212. For example, in some embodiments, the cap body 210 may include an interior projection 240 that is coupled to the sleeve wall 215 and is positioned within the receiving cavity 212. The interior projection 240 may be configured to stop movement of the optical device 202 at a predetermined point (as shown in FIGS. 4 and 5) within the receiving cavity 212 when the optical device 202 is inserted therein. In the illustrated embodiment, the interior projection 240 is a rim or flange that surrounds the loading axis 216 and is configured to engage the mating face 204. The interior projection 240 may extend radially inward toward the loading axis 216. In other embodiments, the interior projection may include a plurality of individual projections that extend radially inward toward the loading axis 216.

Yet still in other embodiments, the sleeve wall 215 may have a non-linear shape that is configured to prevent the mating end 203 or the optical device 202 from moving beyond a predetermined point or depth within the receiving cavity 212. For example, the sleeve wall 215 may be shaped to have two or more inner diameters. The cap edge 228 may form the larger inner diameter and the smaller inner diameter may be defined at a predetermined depth within the receiving cavity 212. The smaller inner diameter may be less than an outer diameter of the ferrule body 206. As such, the sleeve wall 215 may prevent the ferrule body 206 from moving beyond a predetermined point or depth. In some embodiments, the sleeve wall 215 may form an interference fit with the optical device 202 such that the cap body 210 is secured to the optical device 202.

FIG. 4 illustrates the debris-removing cap 200 covering the optical device 202 such that the mating face 204 is disposed within the receiving cavity 212. When the optical device 202 is loaded into the receiving cavity 212, the mating face 204 is inserted into the receiving cavity 212 along the loading axis 216 until the mating face 204 engages the interior projection 240. In some embodiments, the optical device 202 may form an interference fit with the sleeve wall 215. In FIG. 4, the cover surface 213 and/or the cover wall 234 is located in an offset position relative to the mating face 204. In the offset position, a separation gap 236 exists between the lens wiper 220 and the ferrule lens 208. In FIG. 4, the cover surface 213 is facing the mating face 204 of the optical device 202.

FIG. 5 illustrates the cover surface 213 (or cover wall 234) in a displaced position after the debris-removing cap 200 is activated by a user. More specifically, a digit of the user (e.g., finger or thumb) may engage the activation surface 232 of the cap body 210. The activation surface 232 and the interior surface 214 face in opposite directions along the loading axis 216. As shown in FIG. 5, when the user activates the debris-removing cap 200 by pressing the activation surface 232, the flex section 222 permits the cover surface 213 to move in the second direction 219 toward the mating face 204 to the displaced position. As the lens wiper 220 moves with the cover wall 234 from the offset position to the displaced position, the lens wiper 220 engages and wipes the mating face 204, including the ferrule lens 208.

In some embodiments, the flex section 222 is biased to return the cover surface 213 toward the offset position after the user deactivates the debris-removing cap 200 and/or releases the cover wall 234. For example, the sleeve wall 215 may comprise a resilient material that permits the flex section 222 to be compressed, but is biased to return the cover wall 234 to the offset position when the force by the user is removed. After wiping the ferrule lens 208, the debris-removing cap 200 may be removed and the optical device 202 may be mated with another optical device or device.

Optionally, the cover wall 234 may be rotatable about the loading axis 216. For example, the cover wall 234 may be rotatably coupled to the sleeve wall 215 along a seam 250. When the cover wall 234 is located in the displaced position as shown in FIG. 5, the cover wall 234 may be rotated about the loading axis 216 to further remove the debris along the ferrule lens 208.

In an alternative embodiment, the debris-removing cap 200 does not include a flex section 222. Instead, the lens wiper 220 and a depth of the receiving cavity 212 may be configured such that the lens wiper 220 engages the ferrule lens 208 when the optical device 202 is mated with the debris-removing cap 200 and located at the predetermined point or depth. In such embodiments, the cover wall 234 may be rotated about the loading axis 216 while the lens wiper 220 is engaged with the ferrule lens 208 thereby wiping the ferrule lens 208.

FIG. 6 is a side cross-sectional view of a debris-removing cap 300 formed in accordance with an embodiment. The debris-removing cap 300 is configured to cover a mating face 304 of an optical device 302. In an illustrated embodiment, the optical device 302 is similar or identical to the optical device 202 (FIG. 3) and includes a ferrule body 306 that has the mating face 304. The optical device 302 includes a ferrule lens 308 that faces the debris-removing cap 300 in FIG. 6.

In the illustrated embodiment, the debris-removing cap 300 includes a cap body 310 having a receiving cavity 312. The cap body 310 includes a cover wall 314 and a sleeve wall 315 that is coupled to the cover wall 314. The cover and sleeve walls 314, 315 may be similar to the cover and sleeve walls 234, 215 (FIG. 3). The cover wall 314 extends generally perpendicular or orthogonal to a loading axis 316.

As shown in FIG. 6, the cover wall 314 includes a slot or opening 318 that extends across the loading axis 316. The debris-removing cap 300 includes a movable lens wiper 320 that is coupled to the cover wall 314 and disposed within the slot 318. The lens wiper 320 is slidable in a linear direction along a sweep axis 323 that is transverse or perpendicular to the loading axis 316. The sweep axis 323 extends parallel to the mating face 304.

As shown, the lens wiper 320 includes a wiper base 325 and a plurality of flexible strands 326 that are coupled to the wiper base 325. The flexible strands 326 may be similar the flexible bristles or strands 221 (FIG. 3). In alternative embodiments, a foam-like material may replace the flexible strands 326. The wiper base 325 is slidably engaged to the cap body 310 and includes an activation surface 321. The activation surface 321 extends along an exterior of the cap body 310 and may be shaped to facilitate gripping the activation surface 321 with a digit (e.g., thumb or finger). For example, the activation surface 321 includes knurling in FIG. 6. When the optical device 302 is disposed within the receiving cavity 312, a user may activate the lens wiper 320 by engaging the activation surface 321 and moving the lens wiper 320 in the linear direction along the sweep axis 323. The lens wiper 320 moves parallel to the mating face 304. The lens wiper 320 may be moved bi-directionally (e.g., back and forth) along the sweep axis 323 a plurality of times to sweep debris away from the ferrule lens 308.

In alternative embodiments, the mating face 304 may face in a direction that is orthogonal to the loading axis 316. For example, the mating face 304 may be configured for side-mating operations, such as the side-mating operations described in U.S. application Ser. No. 14/635,726 (filed on the same day as the present application). More specifically, the mating face 304 may face in a direction that is along the sweep axis 323 in FIG. 6. In such embodiments, the lens wiper may be slidable in a linear direction along the loading axis 316. Accordingly, the lens wiper may be configured to move parallel to the mating face.

FIG. 7 is a side cross-sectional view of a debris-removing cap 350 formed in accordance with an embodiment. The debris-removing cap 350 is configured to cover a mating face 354 of an optical device 352. In an illustrated embodiment, the optical device 352 is similar or identical to the optical device 202 and includes a ferrule body 356 that has the mating face 354. The optical device 352 includes a ferrule lens 358 that faces the debris-removing cap 350.

In the illustrated embodiment, the debris-removing cap 350 includes a cap body 360 having a receiving cavity 362. The cap body 360 includes a cover wall 364 and a sleeve wall 365 that is coupled to the cover wall 364. The cover and sleeve walls 364, 365 may be similar to the cover and sleeve walls 234, 215 (FIG. 3). The cover wall 364 extends generally perpendicular or orthogonal to a loading axis 367. As shown, the cover wall 364 includes an opening 368 having a movable lens wiper 370 held therein. The lens wiper 370 is rotatable along a sweep axis 373 that is transverse or perpendicular to the loading axis 367 and extends into and out of the page.

The lens wiper 370 includes a wiper base 375 and a plurality of flexible strands 376 that are coupled to the wiper base 375. Optionally, the flexible strands 376 may be replaced with a foam-like material. The wiper base 375 is rotatably engaged to the cap body 360. Also shown, the lens wiper 370 includes an activation or exterior surface 371. The activation surface 371 is exposed to an exterior of the cap body 360. When the optical device 352 is disposed within the receiving cavity 362, a user may activate the lens wiper 370 by rotating the lens wiper 370 along the sweep axis 373 to sweep debris away from the ferrule lens 358. Optionally, the user may rotate the lens wiper 370 bi-directionally about the sweep axis 373 while the ferrule lens 358 is disposed within the receiving cavity 362.

Figure 9:
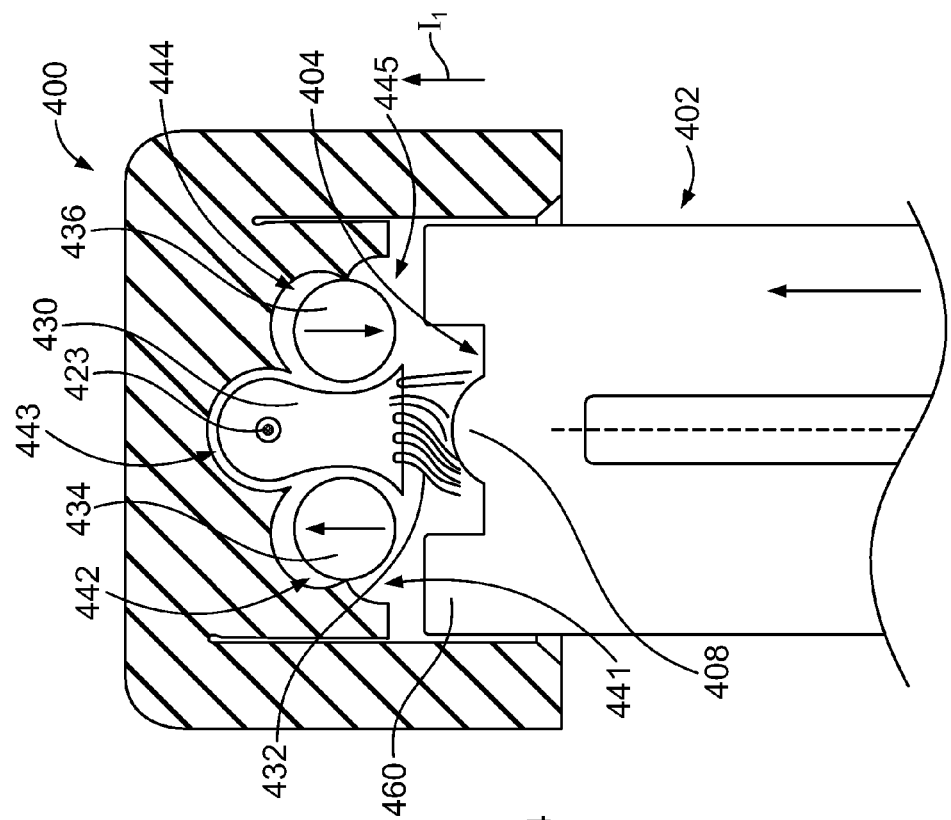
FIG. 9 is a side cross-sectional view of the debris-removing cap of FIG. 8 during activation by a user.
Figure 8:
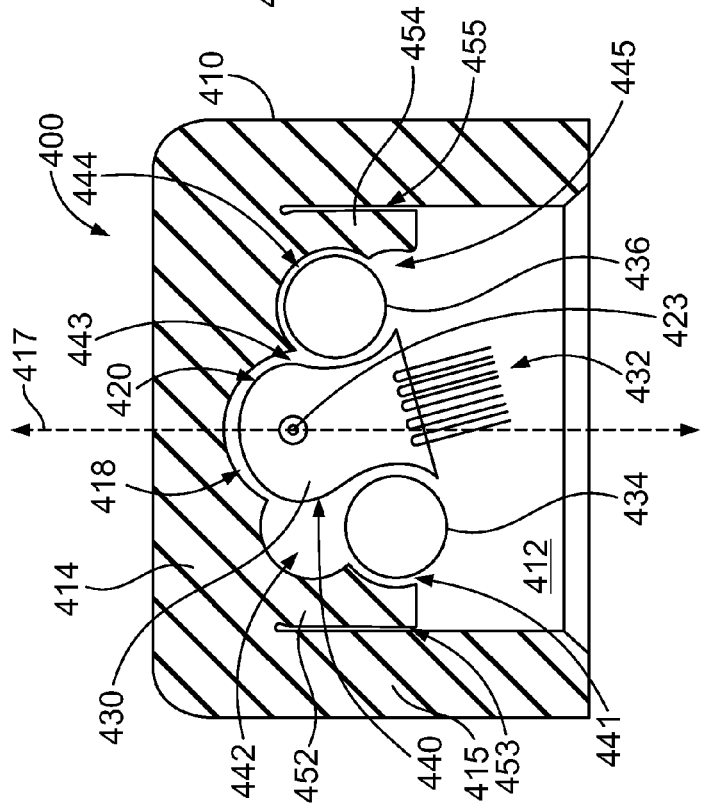
FIG. 8 is a side cross-sectional view of a debris-removing cap formed in accordance with an embodiment.

FIG. 8 is a side cross-sectional view of a debris-removing cap 400 formed in accordance with an embodiment. The debris-removing cap 400 is configured to cover a mating face 404 (FIG. 9) of an optical device 402 (FIG. 9). In the illustrated embodiment, the debris-removing cap 400 includes a cap body 410 having a receiving cavity 412. The cap body 410 includes a cover wall 414 and a sleeve wall 415 that is coupled to the cover wall 414. The cover and sleeve walls 414, 415 may be similar to the cover and sleeve walls 234, 215, respectively (FIG. 3). The cover wall 414 extends generally perpendicular or orthogonal to a loading axis 417. Also shown, the cap body 410 includes first and second flex arms 452, 454 that extend from the cover wall 414 into the receiving cavity 412. As shown, action gaps or slits 453, 455 exist between the first and second flex arms 452, 454 and the sleeve wall 415.

The cover wall 414 includes a wiper recess 418 having a movable lens wiper 420 of the debris-removing cap 400 held therein. The lens wiper 420 may include or constitute a sweeping mechanism that is activated when the optical device 402 is inserted into the receiving cavity 412 and engages the lens wiper 420. The sweeping mechanism may include the first and second flex arms 452, 454, a wiper base 430, and first and second action elements 434, 436. The sweeping mechanism may also include a plurality of flexible strands 432 that are coupled to the wiper base 430. Alternatively, the flexible strands 432 may be replaced with a foam-like material.

The wiper base 430 is rotatable about a sweep axis 423 that is transverse or perpendicular to the loading axis 417 and extends into and out of the page. The first and second action elements 434, 436 are positioned on opposite sides of the wiper base 430. The wiper base 430 has a base surface 440 that conforms to a portion of the contour of the first and second action elements 434, 436. More specifically, the wiper base 430 is shaped to direct the first and second action elements 434, 436 when the wiper base 430 and/or the first and second action elements 434, 436 engage the optical device 402.

The wiper recess 418 is positioned between the first and second flex arms 452, 454. The wiper recess 418 includes recess portions 441, 442, 443, 444, and 445. Each of the recess portions 441-445 is defined by a portion of an interior surface 446 of the cap body 410. The recess portion 441 is sized and shaped to hold the first action element 434. The recess portion 442 is also sized and shaped to hold the first action element 434. The recess portion 443 is sized and shaped to hold the wiper base 430. The recess portion 444 is sized and shaped to hold the second action element 436. The recess portion 445 is also sized and shaped to hold the second action element 436.

In FIG. 8, the lens wiper 420 is in a first stage or configuration. In the first stage, the first action element 434 is positioned between the area of the interior surface 446 that defines the recess portion 441 and the wiper base 430. The second action element 436 is positioned between the area of the interior surface 446 that defines the recess portion 444 and the wiper base 430.

FIG. 9 is a side cross-sectional view of the debris-removing cap 400 as the lens wiper 420 moves from the first stage (FIG. 8) to a second stage or configuration. In some embodiments, the first and second action elements 434, 436 are intervening elements that are configured to be engaged by the optical device 402 and impart a force for driving the wiper base 430. As shown, the optical device 402 includes a mating face 404. The mating face 404 has a leading actuator 460. In an exemplary embodiment, the leading actuator 460 is a projection or edge that surrounds the ferrule lens 408. In other embodiments, the leading actuator 460 may include one or more projections that engage at least one of the first and second action elements 434, 436.

The leading actuator 460 is configured to engage at least one of the first and second action elements 434, 436 when the optical device 402 is inserted into the receiving cavity 412. For example, in the illustrated embodiment, the leading actuator 460 engages the first action element 434 during a loading operation. The leading actuator 460 (or the optical device 402) drives the first action element 434 in a first direction that is parallel to an insertion direction $I_1$. The first action element 434 transfers a force, provided by the optical device 402, that deflects the first flex arm 452 toward the sleeve wall 415. When the first flex arm 452 is deflected, the first action element 434 is permitted to move from the recess portion 441 to the recess portion 442. As the first action element 434 moves to the recess portion 442, the wiper base 430 is rotated about the sweep axis 423 and drives the second action element 436 from the recess portion 444 to the recess portion 445. In the second stage, the first action element 434 is located within the recess portion 442 and the second action element 436 is located within the recess portion 445.

As the wiper base 430 is rotated about the sweep axis 423 during the loading operation, the flexible strands 432 sweep across the ferrule lens 408 thereby removing debris positioned along the ferrule lens 408. The optical device 402 may then be removed from the receiving cavity 412. If the debris-removing cap 400 is used for another loading operation, the first and second action elements 434, 436 may be driven again by the force provided by the optical device 402 during the loading operation. However, the order of movements may be executed in reverse, because the lens wiper 420 is in the second stage. Accordingly, the second action element 436 may be engaged by the leading actuator 460 thereby causing the wiper base 430 to be rotated and move the first action element 434 to a forward position such that the lens wiper 420 is in the first stage.

In alternative embodiments, the debris-removing cap 400 and/or the optical device 402 may include a mechanism for returning the lens wiper 420 to the first stage. For example, as the optical device 402 is removed from the receiving cavity 412 the optical device 402 may pull the first action element 434 back into the forward position. The pulling force may be provided by, for example, a magnet. More specifically, the first action element 434 may be magnetic and the leading actuator 460 may include a magnet that pulls the first action element 434 as the optical device 402 is withdrawn.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A debris-removing cap comprising:
a cap body having a receiving cavity and a cover surface disposed within the receiving cavity, the cap body configured to be attached to an optical device such that a mating face of the optical device is disposed within the receiving cavity, the cover surface configured to face the mating face of the optical device; and
a lens wiper coupled to the cap body and positioned within the receiving cavity, the lens wiper extending away from the cover surface toward the mating face of the optical device, the lens wiper moving relative to the mating face when activated by a user of the debris-removing cap, the lens wiper engaging a lens of the mating face recessed within the optical device when activated by the user to remove debris from the lens, the lens wiper protruding into the optical device when engaging the lens of the recessed mating face.

2. The debris-removing cap of claim 1, wherein the cap body includes a sleeve wall that defines a portion of the receiving cavity and is configured to surround the optical device, the cap body also including an interior projection that is coupled to the sleeve wall and is positioned within the receiving cavity, the interior projection configured to stop movement of the optical device at a predetermined point within the receiving cavity when the optical device is inserted therein.

3. The debris-removing cap of claim 1, wherein the lens wiper comprises a plurality of flexible strands that project away from the cover surface.

4. The debris-removing cap of claim 1, wherein the receiving cavity is configured to receive the optical device when the optical device is inserted in a first direction along a loading axis, the lens wiper facing in a second direction along the loading axis that is opposite the first direction.

5. The debris-removing cap of claim 4, wherein the lens wiper is configured to move in a direction that is generally perpendicular to the loading axis.

6. The debris-removing cap of claim 4, wherein the lens wiper is configured to be translated in a linear direction that is perpendicular to the loading axis to sweep across the lens of the optical device.

7. The debris-removing cap of claim 1, wherein the cap body includes a sleeve wall that surrounds the optical device, the sleeve wall including a flex section that surrounds a portion of the receiving cavity, the flex section permitting the user to compress the sleeve wall to move the lens wiper from an offset position to a displaced position, the lens wiper being moved toward the lens of the optical device when moved to the displaced position.

8. The debris-removing cap of claim 1, wherein the lens wiper is rotatably coupled to the cap body, the lens wiper being configured to sweep across the lens of the optical device when rotated by the user.

9. The debris-removing cap of claim 1, wherein the lens wiper comprises flexible strands and a wiper base that is rotatably coupled to the cap body and affixed to the flexible strands, the optical device configured to engage the wiper base when inserted into the receiving cavity and cause the wiper base to rotate with respect to the cap body.

10. The debris-removing cap of claim 1, wherein the lens wiper comprises flexible strands and a wiper base having an activation surface that is exposed to an exterior of the debris-removing cap, the activation surface configured to be engaged by the user for activating the lens wiper.

11. A debris-removing cap comprising:
a cap body having an interior surface that defines a receiving cavity, the cap body configured to be attached to an optical device such that a mating face of the optical device is disposed within the receiving cavity; and
a lens wiper coupled to the cap body and positioned within the receiving cavity, the lens wiper having an activation surface that is exposed to an exterior of the cap body and is configured to be engaged by a user of the debris-removing cap, the lens wiper engaging a lens of the mating face recessed within the optical device and sweeping across the mating face when activated by the user to remove debris from the lens, the lens wiper protruding into the optical device when engaging the lens of the recessed mating face.

12. The debris-removing cap of claim 1, wherein the cap body includes a sleeve wall that defines a portion of the receiving cavity and is configured to surround the optical device, the cap body also including an interior projection that is coupled to the sleeve wall and is positioned within the receiving cavity, the interior projection configured to stop movement of the optical device at a predetermined point within the receiving cavity when the optical device is inserted therein.

13. The debris-removing cap of claim 1, wherein the lens wiper comprises a plurality of flexible strands.

14. The debris-removing cap of claim 1, wherein the receiving cavity is configured to receive the optical device when the optical device is inserted in a first direction along a loading axis, the lens wiper facing in a second direction along the loading axis that is opposite the first direction.

15. The debris-removing cap of claim 4, wherein the lens wiper is configured to move in a direction that is generally perpendicular to the loading axis.

16. The debris-removing cap of claim 4, wherein the lens wiper is configured to be translated in a linear direction that is perpendicular to the loading axis to sweep across the lens of the optical device.

17. The debris-removing cap of claim 1, wherein the cap body includes a sleeve wall that surrounds the optical device, the sleeve wall including a flex section that surrounds a portion of the receiving cavity, the flex section permitting the user to compress the sleeve wall to move the lens wiper from an offset position to a displaced position, the lens wiper being moved toward the lens of the optical device when moved to the displaced position.

18. The debris-removing cap of claim 1, wherein the lens wiper is rotatably coupled to the cap body, the lens wiper being configured to sweep across the lens of the optical device when rotated by the user.

19. The debris-removing cap of claim 1, wherein the lens wiper comprises flexible strands and a wiper base that is rotatably coupled to the cap body and affixed to the flexible strands, the optical device configured to engage the wiper base when inserted into the receiving cavity and cause the wiper base to rotate with respect to the cap body.

20. The debris-removing cap of claim 1, wherein the lens wiper is permitted to move back-and-forth across the mating face.

* * * * *